(12) United States Patent
Galtier et al.

(10) Patent No.: US 9,462,608 B2
(45) Date of Patent: Oct. 4, 2016

(54) METHOD AND DEVICE FOR REGULATING TRANSMISSION IN A TELECOMMUNICATION NETWORK

(71) Applicant: Orange, Paris (FR)

(72) Inventors: Jerome Galtier, Nice (FR); Patrick Brown, Cagnes sur Mer (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/431,164

(22) PCT Filed: Sep. 26, 2013

(86) PCT No.: PCT/FR2013/052265
§ 371 (c)(1),
(2) Date: Mar. 25, 2015

(87) PCT Pub. No.: WO2014/049272
PCT Pub. Date: Apr. 3, 2014

(65) Prior Publication Data
US 2015/0257172 A1 Sep. 10, 2015

(30) Foreign Application Priority Data
Sep. 28, 2012 (FR) ..................................... 12 59229

(51) Int. Cl.
*H04W 4/00* (2009.01)
*H04W 74/00* (2009.01)
*H04L 29/12* (2006.01)
*H04W 84/12* (2009.01)
*H04W 74/08* (2009.01)

(52) U.S. Cl.
CPC ........ *H04W 74/002* (2013.01); *H04L 61/2038* (2013.01); *H04L 61/35* (2013.01); *H04W 74/0816* (2013.01); *H04W 84/12* (2013.01)

(58) Field of Classification Search
CPC ............. H04W 74/002; H04W 84/12; H04W 74/0816; H04L 61/2038; H04L 61/35
See application file for complete search history.

(56) References Cited

U.S. PATENT DOCUMENTS

| 2007/0002734 A1 | 1/2007 | Kim et al. | |
| 2009/0109993 A1* | 4/2009 | Galtier | H04W 74/0841 370/462 |
| 2010/0322220 A1* | 12/2010 | Brown | H04W 74/002 370/338 |

FOREIGN PATENT DOCUMENTS

| WO | 2005020518 A1 | 3/2005 |
| WO | 2009095628 A1 | 8/2009 |

OTHER PUBLICATIONS

International Search Report and Written Opinion dated Jan. 9, 2014 for corresponding International Application No. PCT/FR2013/052265, filed Sep. 26, 2013.

(Continued)

*Primary Examiner* — Clemence Han
(74) *Attorney, Agent, or Firm* — David D. Brush; Westman Champlin & Koehler, P.A

(57) ABSTRACT

A method is provided for regulating transmission implemented by a station, having at least one packet to be transmitted via a communication network, and participating in at least one tournament composed of a succession of selection rounds. The method includes: obtaining by the station, for each selection round of a first tournament, a binary value assigned to the station, representative either of an authorization to transmit, or of a prohibition to transmit, transmitting, on completion of the first tournament, at least one packet by the station when the station determines, as a function of at least one of the binary values assigned to the station for the selection rounds of the first tournament, that the station is authorized to transmit. The at least one packet transmitted by the station includes data representative of the succession of binary values assigned to the station for the selection rounds.

12 Claims, 2 Drawing Sheets

(56) References Cited

OTHER PUBLICATIONS

Zakhia G. Abichar et al., "CONTI: Constant-Time Contention Resolution for WLAN Access", Internet Citation, May 6, 2005, XP002392550.

French Search Report and Written Opinion dated Jun. 4, 2013 for corresponding French Application No. 1259229, filed Sep. 28, 2012.
English translation of the Written Opinion dated Mar. 28, 2015 for corresponding International Patent Application No. PCT/FR2013/052265, filed Sep. 26, 2013.

\* cited by examiner

METHOD AND DEVICE FOR REGULATING TRANSMISSION IN A TELECOMMUNICATION NETWORK

CROSS-REFERENCE TO RELATED APPLICATIONS

This Application is a Section 371 National Stage Application of International Application No. PCT/FR2013/052265, filed Sep. 26, 2013, the content of which is incorporated herein by reference in its entirety, and published as WO 2014/049272 on Apr. 3, 2014, not in English.

FIELD OF THE DISCLOSURE

The present invention relates to the field of telecommunication networks. It finds a beneficial application in wireless telecommunications networks, in particular in wireless local area networks (WLANs) in accordance with the family of IEEE 802.11 standards or more generally with networks of CSMA/CA (Carrier Sense Multiple Access with Collision Avoidance) type.

BACKGROUND OF THE DISCLOSURE

Networks in accordance with the IEEE 802.11 standards are also dubbed Wi-Fi networks. They are used to network stations (for example computers, personal assistants and peripherals) in numerous applications.

The 802.11 standard defines in the document "IEEE 802.11a-1999, IEEE 802.11b-1999, IEEE-802.11d-2001, Part 11: wireless LAN medium access control (MAC) and physical layer (PHY) specifications" a method for regulating the traffic in the wireless network. This method uses a system of congestion windows (Congestion Window "CW") to regulate this traffic. According to this standard, to determine the instant at which to send a data packet, a station draws a random number between 0 and CW-1, the value CW being an integer lying between two values $CW_{min}$ and $CW_{max}$ specified by the 802.11 standard.

This value CW serves as backoff counter for the sending of the packet, this counter being deferred if the station notes that another station is in the process of sending. Unfortunately, this system based on congestion windows generates a significant number of collisions on the wireless network, this being manifested, from the user's point of view, by a significant loss of bandwidth.

Another mechanism known by the name "tournament scheme" may be used by the various stations to regulate the sending of packets and to limit the collision rate. This tournament scheme is described in the document by the authors Z. Abichar and M. Chang, entitled "CONTI: Constant Time Contention Resolution for WLAN Access", IFIP Networking 2005.

The tournament scheme consists in organizing a sort of tournament between the stations having to send a packet. A tournament is composed of a certain number of selection rounds, each executed for a time interval of predefined duration allowing each station to have time to hear the sending of any other. This duration can typically be equal to the duration of the time interval dubbed "SlotTime" which, according to the IEEE 802.11 norm, is defined as elementary interval in the congestion window based contention resolution procedure.

At the start of the tournament, all the stations having to send a packet may be authorized to send this packet. At each selection round, one or more stations may be deleted from the list of the stations authorized to send, depending on whether an authorization or a prohibition to send is allotted to them during this selection round. On completion of the tournament, only the non-eliminated stations are authorized to send. If several stations remain in the running on completion of the tournament, they send at the same time, thus causing a collision and therefore disturbed reception with no possibility of correctly receiving the data packets sent. These stations will then have to participate in the next tournament so as to attempt to send these packets again.

In the case of the sending of data streams requiring priority access to the network or a high bandwidth, the need is apparent to provide a solution for regulating sending make it possible to guarantee a performance level in terms of bandwidth or of bitrate and also a quality of service.

Patent application WO 2009/095628 describes a solution, using the tournament scheme and allowing, when in the presence of stations having streams of various priority levels to be sent, equitable sharing of access to the radio medium between the various stations.

In this solution, the values representative of an authorization or prohibition to send which are assigned to a station for the selection rounds of a current tournament are deduced from an index value, assigned to the station for the current tournament and calculated on the basis of an index value assigned to the station for an earlier tournament.

Patent application WO 2009/095628 more precisely describes a scheduling scheme of Round Robin type, designed to be implemented between stations having to send packets and belonging to one and the same class of packets. By listening to the signals sent during the selection rounds of a tournament, a station can determine the series of values representing the authorizations or prohibitions obtained in the course of the various selection rounds by the station winning the tournament. This series of values allows the station to determine, on the basis of the index value A used by this station for the determination of the values representing the authorizations or prohibitions which are allocated to it in the course of the current tournament, an index value A', to be used for the determination of the values representing the authorizations or prohibitions of the various selection rounds to be used for the following tournament.

The value A' is in particular calculated on the basis of the value A, by a circular permutation operation of length $A^i$ on the value of A in the interval [0; 1[, which is defined as follows:

$A'=A+1-A^i$ if $A<A^i$ $A'=A-A^i$ if $A \geq A^i$ where $[A^{i-1}, A^i[$ is the value interval containing the index value $A_{win}$ used by the station that has won the current tournament, with i=1 to Z (Z being a positive integer). Note that, as described in patent application WO 2009/095628, the Z intervals $[A^0, A^1[, \ldots [A^i, A^{i+1}[, \ldots [A^{Z-1}, A^Z[$ form a partition of the interval [0; 1[ with $A^0=0$ and $A^Z=1$.

The solution described in patent application WO 2009/095628 does not operate in an optimal way when the signals sent by the stations during the selection rounds are scrambled, because for example of propagation problems related to obstacles or of poor radio conditions.

Consequently, the value of $A^i$ cannot be determined correctly by all the stations implementing the Round Robin scheme and the circular permutation performed on the index value A by one station will not be identical to the circular permutation performed by the other stations. The performance of the Round Robin is affected thereby in that equity of access to the radio medium is no longer guaranteed. In particular, the number of collisions between stations may therefore increase appreciably, giving rise to a degradation of the transmissions.

SUMMARY

One of the aims of the invention is to remedy inadequacies and drawbacks of the prior art and/or to afford improvements thereto.

The invention relates, according to a first aspect, to a first method of regulating sending implemented by a station, having at least one packet to be sent via a communication network, participating in at least one tournament composed of a succession of selection rounds, the method comprising,
- a step of obtaining by said station, for each selection round of a first tournament, of a binary value assigned to said station, representative either of an authorization to send, or of a prohibition to send,
- a step of sending, on completion of the first tournament, of at least one packet by said station when said station determines, as a function of at least one of the binary values assigned to said station for said selection rounds of the first tournament, that said station is authorized to send, said at least one packet sent by said station comprising data representative of the succession of the binary values, assigned to said station for said selection rounds.

This method of regulation according to the first aspect is implemented by a station that has won the tournament. The transmission of data about the succession of the binary values assigned to the winning station makes it possible to inform the other stations about this succession of binary values and therefore to culminate in a correct estimation of the parameter $A^i$ serving for the determination of the index value to be used for the next tournament. The other stations do indeed receive this item of information as a supplement to the signals received during the tournament, thereby making it possible to enhance the reliability and standardize the behavior of the various stations.

The data representative of the succession of the binary values can be chosen in various ways.

In a first variant, said data comprise said succession of the binary values assigned to said station for said selection rounds.

In a second variant, said data comprise an index value on the basis of which said succession of binary values has been determined.

In a third variant, said data comprise a value representing the length of a circular permutation intended to be applied to an index value assigned to a station participating in said first tournament so as to determine, for each selection round of a second tournament subsequent to the first tournament, of a binary value assigned to said station, representative either of an authorization to send, or of a prohibition to send.

The invention relates, according to a second aspect, to a second method of regulating sending implemented by a station, having at least one packet to be sent via a wireless communication network, participating in at least one tournament composed of a succession of selection rounds, the method comprising,
- a step of obtaining by said station, for each selection round of a first tournament, of a binary value assigned to said station, representative either of an authorization to send, or of a prohibition to send,
- a step of listening for a sending of at least one packet sent by another station which is authorized to send on completion of the first tournament, said at least one packet sent by said other station comprising data representative of the succession of the binary values, assigned to said other station for said selection rounds.

This method of regulation according to the second aspect is implemented by a station that has not won the tournament. The reception of data representative of the succession of the binary values assigned to the winning station makes it possible to culminate in a correct estimation of the parameter $A^i$ serving for the determination of the index value to be used for the next tournament.

According to a first embodiment, this second method comprises a step of implementation by said station of a second tournament subsequent to the first tournament, comprising a step of determination, for each selection round of said second tournament, of a binary value assigned to said station, representative either of an authorization to send, or of a prohibition to send, on the basis of the data representative of the succession of the binary values, assigned to said other station. The data transmitted with the packet and received by a station are directly usable to determine the authorizations and/or prohibitions to send from which this station benefits for the next tournament.

According to a second embodiment, this second method comprises a step of implementation by said station of a second tournament subsequent to the first tournament, comprising a step of determination, for each selection round of said second tournament, of a binary value assigned to said station, representative either of an authorization to send, or of a prohibition to send, on the basis of data representative of a predetermined succession of binary values representative of an authorization or prohibition to send. Predefined data, being able simply to be stored in memory in a configuration phase, are directly usable to determine the authorizations and/or prohibitions to send from which this station benefits for the next tournament.

According to a variant embodiment compatible with any one of the aforementioned embodiments, a said binary value assigned to said station for a selection round of the first tournament is obtained on the basis of an index value $A(p)$ representative of the behavior of said station during the first tournament, in which a said binary value assigned to said station for a selection round of the second tournament is obtained on the basis of an index value $A(p+1)$ representative of the behavior of said station during the second tournament, the second method furthermore comprising a step of determination of the index value $A(p+1)$ on the basis of the index value $A(p)$ and of data representative of a succession of binary values representative of an authorization or prohibition to send.

These data are either the aforementioned data transmitted with the packet, or aforementioned predefined data, common to all the stations, which are representative of a predetermined succession of binary values representative of an authorization or prohibition to send. The method of regulation is thus compatible with the implementation of inter-station scheduling schemes, of the Round Robin type, described in patent application WO 2009/095628. The invention enhances the reliability of the implementation of these scheduling schemes, by virtue of which the various stations will benefit from equitable access to the transmission medium.

In particular, said index value $A(p+1)$ is obtained as follows:

$$A(p+1)=A(p)+1-A_n^i \text{ if } A(p)<A_n^i$$

$$A(p+1)=A(p)-A_n^i \text{ if } A(p)\geq A_n^i$$

where $A_n^i$ is a value obtained on the basis of the data representative of a succession of binary values representative of an authorization or prohibition to send.

This determination of the index value assigned to a station allows a simple implementation of the inter-station scheduling schemes.

Correlatively, the subject of the invention is a device for regulating sending of a station, having at least one data packet to be sent via a communication network, participating in at least one tournament composed of a succession of selection rounds, the device comprising means of obtaining by said station, for each selection round of a first tournament, of a binary value assigned to said station, representative either of an authorization to send, or of a prohibition to send, means of sending, on completion of the first tournament, of at least one packet by said station when said station determines, as a function of at least one of the binary values assigned to said station for said selection rounds of the first tournament, that said station is authorized to send, said at least one packet sent by said station comprising data representative of the succession of the binary values, assigned to said station for said selection rounds.

The stated advantages in respect of the method according to the invention are directly transposable to the device according to the invention.

According to a preferred implementation, the various steps of the method according to the invention are implemented by software or a computer program, this software comprising software instructions intended to be executed by a data processor of a packet sending station and designed to control the execution of the various steps of this method.

Consequently, the invention is also aimed at a program, able to be executed by a computer or by a data processor, this program comprising instructions for controlling the execution of the steps of a method such as is mentioned hereinabove.

This program can use any programming language, and be in the form of source code, object code, or of intermediate code between source code and object code, such as in a partially compiled form, or in any other desirable form.

The invention is also aimed at an information medium readable by a computer or data processor, and comprising instructions of a program such as is mentioned hereinabove.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can in particular be downloaded from a network of Internet type.

Alternatively, the information medium can be an integrated circuit into which the program is incorporated, the circuit being adapted for executing or to be used in the execution of the method in question.

According to another realization, the invention is implemented by means of software and/or hardware components. In this regard, the term module can correspond in this document equally well to a software component or to a hardware component. A software component corresponds to one or more computer programs, one or more subprograms of a program, or more generally to any element of a program designed to implement a function or a set of functions. A hardware component corresponds to any element of a hardware assembly designed to implement a function or a set of functions.

BRIEF DESCRIPTION OF THE DRAWINGS

Other aims, characteristics and advantages of the invention will become apparent through the description which follows, given solely by way of nonlimiting example and with reference to the appended drawings in which.

DETAILED DESCRIPTION OF ILLUSTRATIVE EMBODIMENTS

The method and the device according to the invention are now described in greater detail. As already mentioned in the introduction to the present patent application, the invention calls upon the notion of class of packets. The notion of class of packets used in this document should be interpreted in the broad sense.

By way of example, the IEEE 802.11 standard defines eight classes of packet, respectively dubbed "Control" (control packets), "Voice" (packets belonging to a stream which transmits voice), "Audio" (packets belonging to an audio stream), "Class 1", "Class 2", "Class 3", "Class 4" and "Best Effort". A class of this standard corresponds to a category of stream having specific needs in terms of quality of service: a minimum bandwidth, a low transmission error rate, etc.

Other ways of defining packet classes are also conceivable. These classes may in particular be defined as a function of any parameter characteristic of the packet or of the stream to which this packet belongs: for example as a function of the size of the packet, as a function of the priority level of the packet, as a function of the duration of the communication stream to which the packet belongs, as a function of the origin or of the destination of the packet, etc.

The invention is applicable to any packet classification system, provided that the membership class to which a packet belongs can be determined or obtained in one way or another by the station having this packet to be sent. The invention makes it possible to process in a differentiated manner the various defined classes, while guaranteeing for each of these classes a quality of service in terms of bandwidth and equity of processing.

It is assumed here that the class n assigned to a packet is coded by an integer value included in an interval of values $[N_{min}, N_{max}]$, for example $[1, 8]$.

The method of regulating sending will now be described in the case of its application to a radio telecommunication network. It is nonetheless applicable more generally to all networks of CSMA/CA (Carrier Sense Multiple Access with Collision Avoidance) type in which access to the transmission medium must be controlled so as to prevent two sender stations from sending simultaneously, that is to say to avoid collisions.

In the ensuing description the following notations will be used:
- k is the index identifying the selection round in the course of a tournament;
- $k_{max}$ is the maximum number of selection rounds for a tournament;
- r is a binary random variable;
- r(k) is the value of the binary random variable r drawn at the selection round of index k; r(k) belongs to the set {0,1}, the value "1" usually being representative of an authorization to send, whilst the value "0" is representative of a prohibition to send.

Figure 1:
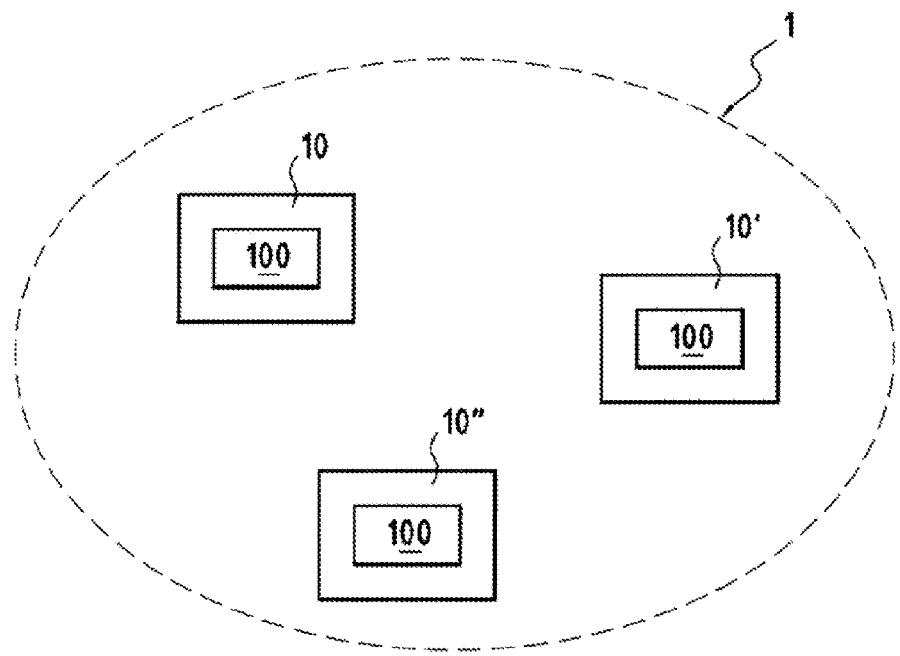
FIG. 1 represents a wireless telecommunication network with stations in accordance with the invention in a preferred embodiment.

FIG. 1 represents a wireless telecommunication network 1 in which stations 10, 10', 10" in accordance with the invention are deploying. Each of these stations 10 comprises a device 100 for regulating sending in accordance with the invention.

Figure 2:
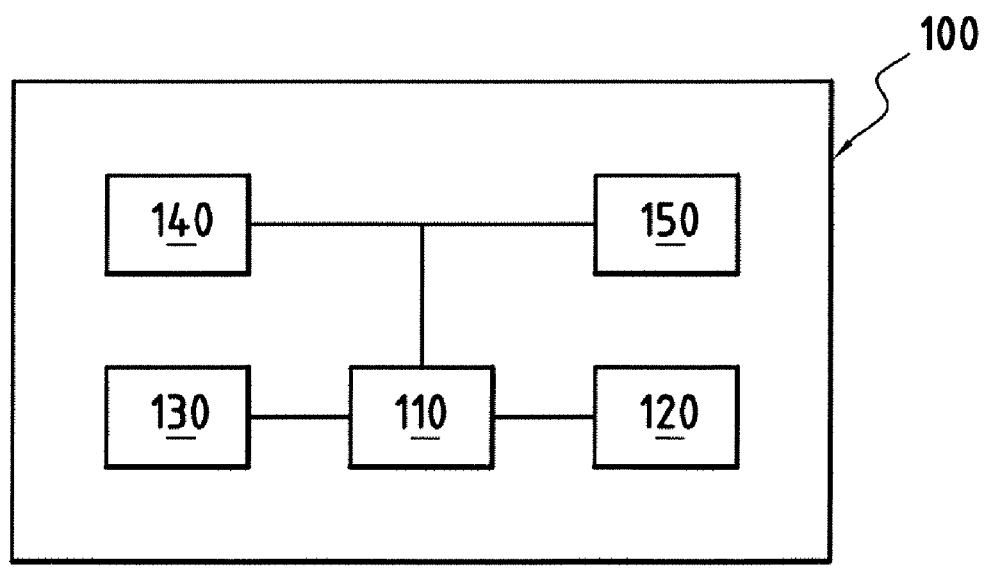
FIG. 2 represents a device for regulating sending in accordance with the invention in a preferred embodiment.

In the mode illustrated in FIG. 2, the device 100 according to the invention comprises a processor 110, a random-access memory 120, a read-only memory of ROM type 130, a module 140 for access to the network 1, for sending and receiving packets and signals in the wireless telecommunication network 1 and a table of values of probabilities 150, containing the values representative of the prohibitions or authorizations obtained by a station for the various selection rounds of a tournament. These various elements are linked together by a data bus system, not referenced. The means 140 for dispatching and receiving data packets and signals on the wireless telecommunication network 1 consist, in the example described here, of a card for access to the network 1 in accordance with the family of IEEE 802.11 standards.

The stations 10, 10', 10" furthermore each comprise a module for regulating sending, which implements the method of regulating sending which will be described hereinbelow.

For the implementation of the invention, use is made of the tournament scheme cited in the introduction. In the tournament scheme, such as described by CONTI in the document referenced hereinabove, the authorizations or prohibitions to send are allotted to the stations by using binary random variables having a Bernoulli distribution law. This distribution law is defined by a probability of drawing an authorization to send. Such a probability r is thus assigned to each station and to each selection round k.

The method described here diverges from the known CONTI solution in particular in that for a station 10, at each tournament, an index value, representative of the behavior of the station in the course of the tournament, is used to calculate the binary values r(k) to be used in the course of this first tournament for the various selection rounds k, with $1 \leq k \leq k_{max}$. These binary values r(1) to r(k) are stored in memory by the station and used in tandem with the selection rounds 1 to $k_{max}$.

The determination of these binary values r(k) takes into account the class n to which the packet or packets to be sent by the station belongs. This taking into account of the class n is performed in the following manner.

For each class n of packets, a series of Z sub-intervals $[A_n^{i-1}, A_n^i[$ effecting a partition of the interval [0; 1[ is defined. It determines the probability that a station of this class of packet accesses the network.

A station, having a packet of class n to be sent, obtains the series of the Z sub-intervals $[A_n^{i-1}, A_n^i[$ which is associated with class n. The station thereafter identifies that sub-interval $[A_n^{i-1}, A_n^i[$ containing the index value obtained for the current tournament: the binary values r(1) to r(k) used by the station during the current tournament will be the binary values r(1) to r(k) of the sequence of binary values r(1) to r(k) which is associated with the sub-interval $[A_n^{i-1}, A_n^i[$ identified. Conventionally, this identification is done by random drawing, the probability of a station choosing the interval $[A_n^{i-1}, A_n^i[$ being directly proportional to the length of this interval, namely to the difference:

$$A_n^i - A_n^{i-1}$$

The way of determining the values r(k) on the basis of a unique initial index value A which has just been described makes it possible to circumvent the drawing of a value r(k) at each selection round of the tournament, since these can be deduced directly from the index value A drawn at the outset, while guaranteeing that the distribution, between the stations, of the chances of sending is the same as that which would have been obtained by actually drawing a value, and based on the probabilities $p_n^k(r(1), \ldots, r(k))$ assigned to the various nodes $N^k(r(1), \ldots, r(k))$.

When a scheduling scheme of Round Robin type is implemented by the station 10, the determination of the index value A(p+1), representative of the behavior of the station in the course of a tournament p+1 (p an integer greater than or equal to 1), is determined by an iterative scheme on the basis of an index value A(p) used for an earlier tournament p, by applying to this index value A(p) a circular permutation over the interval [0; 1[ of given length $A_n^i$. This iterative scheme operates as follows.

During a first tournament (p=1), an index value A(1) is determined by the station 10 by drawing of a binary value with a probability of drawing assigned to the station 10. Next this station determines, as indicated hereinabove, as a function of the index value A(1) drawn, the sequence of the binary values r(k) to be used in the course of this first tournament for the various selection rounds k, with $1 \leq k \leq k_{max}$.

During the tournament following the first tournament (p=2), the station calculates, on the basis of the index value A(1) used during the first tournament, a new index value denoted A(2) as follows:

$$A(2)=A(1)+1-A_n^i \text{ if } A(1)<A_n^i$$

$$A(2)=A(1)-A_n^i \text{ if } A(1) \geq A_n^i$$

where $[A_n^{i-1}, A_n^i[$ is the value interval containing the index value $A_{win}$ used by the station that has won the current tournament; next, this station determines, as indicated hereinabove, as a function of the index value A(2) thus calculated, the sequence of the binary values r(k) to be used in the course of this second tournament for the various selection rounds k, with $1 \leq k \leq k_{max}$.

Next, in an iterative manner, during a following tournament ((p+1)$^{th}$ tournament), the station determines, on the basis of the index value A(p) used during the p$^{th}$ tournament, a new index value denoted A(p+1) as follows:

$$A(p+1)=A(p)+1-A_n^i \text{ if } A(p)<A_n^i$$

$$A(p+1)=A(p)-A_n^i \text{ if } A(p) \geq A_n^i$$

where $[A_n^{i-1}, A_n^i[$ is the value interval containing the index value $A_{win}$ used by the station that has won the p$^{th}$ tournament; and then this station determines, as indicated hereinabove, as a function of the index value A(p+1) thus calculated, the binary values r(k) to be used in the course of this (p+1)$^{th}$ tournament for the various selection rounds k, with $1 \leq k \leq k_{max}$.

Figure 3:
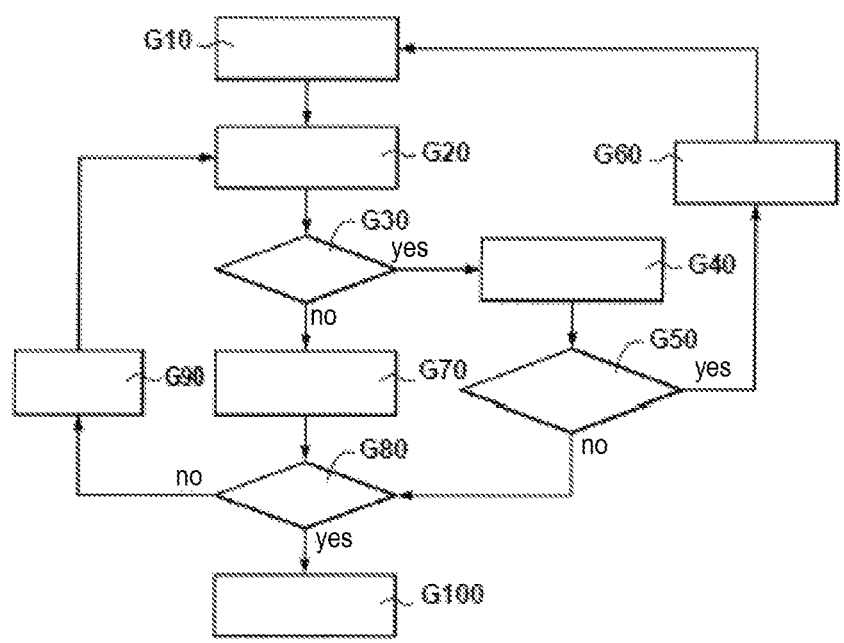
FIG. 3 represents, in flowchart form, the main steps of a method of regulating sending according to the invention.

The main steps G10 to G100 of a method of regulating sending according to the invention are now described with reference to FIG. 3. This method is implemented by the sending management module of a station 10 having a data packet to be sent through the network 1. All the stations having a data packet to be sent, implement this same method simultaneously, without mutual consultation or interrogation, other than what is described in the steps described hereinbelow, being necessary between these stations.

The method described here is implemented by a station 10. It corresponds to what is called a tournament: it is repeated by each station as long as it has packets to be sent. The stations having packets to be sent all commence, at the same instant, the contention resolution procedure by implementation of a tournament.

This instant is chosen in such a way that the stations compliant with the 802.11 standard are prevented from sending, because of the commencing of the tournament and of the sendings of signals that this tournament involves.

This instant is for example dependent on a criterion analogous to that used for the congestion window system according to the IEEE 802.11 norm, that is to say that the tournament commences after a predefined time period DIFS1 (which may be different from the time period DIFS (DCF Inter Frame Space) defined in the 802.11 standard).

In the course of a first step G10, the station 10 initializes a variable k to the value 1, this variable representing the index of the current selection round.

During this same step G10, each station having a packet to be sent determines, according to the iterative scheme described above, an index value A(p) representative of the behavior of the station in the course of the current tournament p. This index value A(p) represents the probability that the station 10 is authorized to send a packet on completion of the tournament p. The station thereafter determines the sequence of the binary values r(k) to be used in the course of this $p^{th}$ tournament for the various selection rounds k, with $1 \leq k \leq k_{max}$.

In step G20, the station reads in memory the value r(k) associated with the current selection round.

This step G20 is followed by a step G30 in the course of which it is verified whether the binary value r(k) obtained for the selection round k is equal to "0".

If the binary value r(k) obtained for the selection round k is equal to "0" (case of a prohibition to send), this test G30 is followed by a step G40 in the course of which the station 10 listens to the wireless telecommunication network in order to determine whether another station 10', 10" has sent a signal indicating that this other station 10', 10" desires to send a data packet.

If such a signal is detected (result of the test of step G50 positive), the method terminates with step G60, without the station 10 having sent its data packet. In the course of this step G60, the station 10 waits for the end of the selection rounds and the possible sending of a packet by another station 10', 10" before again executing the initialization step G10 already described.

On the other hand, if in step G40 no signal is detected (result of the test of step G50 negative), this test is followed by a test in step G80 in the course of which it is determined whether round k is the last selection round, this amounting to verifying whether the variable k is equal to the value $k_{max}$. If such is the case, the station 100 sends its data packet in the course of a step G100.

On the other hand, if k is strictly less than $k_{max}$, the result of the test of step G80 is negative. This step is then followed by a step G90 in the course of which the value of the variable k is incremented by one unit, with a view to the execution of the following selection round.

If in the course of the test of step G30, it is determined that the binary value r(k) obtained for the selection round k is equal to the predetermined value 1 (case of an authorization to send), this test G30 is followed by a step G70 of sending a signal indicating that the station 100 desires to send a data packet on the network.

This step G70 of sending a signal is followed by step G80 already described in the course of which it is verified whether the current selection round k is the last selection round. If such is the case, this test G80 is followed by step G100 of sending of the data packet by the station 10. On the other hand, if such is not the case, this test G80 is followed by the incrementation step G90 already described.

The incrementation step G90 is followed by a new execution of steps G20 to G80 already described, for the following selection round and according to the logic, which has just been described, by which the steps are strung together.

Case of a Station Winning the Tournament.

The packet, sent on completion of the tournament during step G100, by a station 10, 10' or 10" winning the tournament, comprises data $Q_{win}$ representative of the winning key of the tournament: the winning key is defined here as the succession of at most $k_{max}$ binary values r(k), assigned to the winning station for the $k_{max}$ selection rounds.

These data $Q_{win}$ consist of:
  either directly the binary values r(k) used by the winning station for the $k_{max}$ selection rounds; these values are denoted $r_{win}(k)$ with $1 \leq k \leq k_{max}$;
  or the index value A, denoted $A_{win}$ on the basis of which the winning station has determined the binary values $r_{win}(k)$ used by the station for the $k_{max}$ selection rounds,
  or the value $A_n^i$, identifying the interval $[A_n^{i-1}, A_n^i[$ associated with the class n of packet and containing the index value $A_{win}$; this particular value $A_n^i$ is denoted $A_{n,win}^i$: it is the length of the circular permutation to be applied to an index value assigned to a station.

All these data $Q_{win}$ make it possible to retrieve the value $A_{n,win}^i$ allowing a station to calculate, according to the circular permutation defined hereinabove, the index value that the station will use during step G10 of the next tournament to calculate the binary values r(k) representative of the authorizations or prohibitions to be used by the station in the course of the various selection rounds of the next tournament.

Two typical cases can occur: either there has been collision between sendings of packets originating from at least two distinct winning stations, or there has been no collision.

First Case: Absence of Collision

In the absence of collision, a station winning a tournament p uses the value $A_{n,win}^i$ of the interval $[A_{n,win}^{i-1}, A_{n,win}^i[$ containing the index value $A_{win}=A(p)$ which is assigned to it to update its index value A(p+1):

$A(p+1)=A(p)+1-A_{n,win}^i$ In the following tournament (p+1), the winning station determines, on the basis of the index value A(p+1) thus calculated, the succession of the $k_{max}$ binary values r(k) that are representative either of an authorization to send, or of a prohibition to send, and that are assigned to this winning station for the selection rounds 1 to $k_{max}$ of the following tournament (p+1).

In the absence of collision, a station not winning the tournament listens for the sending of at least one packet by the winning station and obtains the data $Q_{win}$ representing the winning key of the tournament that are sent by the winning station with or in this packet. Next the non-winning station determines the value of $A_{n,win}^i$ to be used and calculates its index value A(p+1) for the following tournament on the basis of the index value A(p) used for the current tournament:

$$A(p+1)=A(p)+1-A_{n,win}^{i} \text{ if } A(p)<A_{n,win}^{i}$$

$$A(p+1)=A(p)-A_{n,win}^{i} \text{ if } A(p) \geq A_{n,win}^{i}$$

In the following tournament (p+1), the non-winning station determines, on the basis of the index value A(p+1) thus calculated, the succession of the $k_{max}$ binary values r(k) that are representative either of an authorization to send, or of a prohibition to send, and that are assigned to this non-winning station for the selection rounds 1 to $k_{max}$ of the following tournament (p+1).

Second Case: Collision Between at Least Two Packet Sendings or Disturbed Packet Sending Because of the collision, a station's listening for the sent data representative of the winning key of the tournament is disturbed. Furthermore, as two different stations have sent data representative of the winning key, there is uncertainty about the winning key to be used.

In such a situation, two variant embodiments are conceivable.

In a first variant embodiment, a station, be it winning or non-winning, uses instead of the data representative of the winning key, data representative of a predetermined key, that is to say representative of a predetermined succession of at most $k_{max}$ binary values r(k). In this predetermined succession, all the binary values r(k) are preferably equal to 1, that is to say all the binary values are representative of an authorization to send.

In a second variant embodiment, a station, be it winning or non-winning, uses instead of the data representative of the winning key, data deduced from the signals that it has detected during the selection rounds of the tournament which has just terminated: these are the signals possibly sent in step G70 by a station benefiting from an authorization to send at a given selection round k. When a station is listening for signals, the station may hear a signal wrongly (false alarm) or may not hear a signal sent (non-detection).

The determination of the winning key is done in the following manner.

If during a selection round k, no station has sent any signal in step G70, the value r(k) defining the winning key is necessarily equal to 0 (prohibition to send). Indeed, all the stations are listening and detect that no signal has been sent. Therefore, problem of false detection excepted, each station is capable of determining that the value r(k) is equal to 0 for this selection round.

If during a selection round k, at least one station has sent a signal in step G70, the value r(k) defining the winning key is equal to 1 (authorization to send). Indeed, a station which has sent during this selection round k knows that a signal has been sent, even if it may not hear a possible signal sent by another station. Moreover, the stations that have not sent any signal are listening and have heard the sending (reception error excepted) of another station. Therefore, reception error excepted, each of the stations participating in the tournament is capable of determining that the value r(k) is equal to 1 for this selection round.

By generalizing the two variant embodiments which have just been described relating to the case of packet sending with collision between two stations or the case of disturbed packet sending, a station obtains data representative of a tournament key $Q_{def}$ that is to say of the data representative of a succession of binary values r(k), denoted $r_{def}(k)$ with $1 \leq k \leq k_{max}$, representing authorizations or prohibitions to send for a succession of $k_{max}$ selection rounds.

In the first variant these data are predefined by configuration and stored in memory previously.

In the second variant, these data are determined during the tournament, for each tournament.

These data $Q_{def}$ consist:
either directly of this succession of $k_{max}$ binary values $r_{def}(k)$;
or of an index value A, denoted $A_{def}$ corresponding to this succession of $k_{max}$ binary values $r_{def}(k)$,
or of a particular value $A_n^i$, denoted $A_{n,def}^i$, identifying an interval $[A_n^{i-1}, A_n^i[$ associated with the class n of packet, corresponding to this succession of $k_{max}$ binary values $r_{def}(k)$.

All these data make it possible to retrieve the value $A_{n,def}^i$.

In these two variant embodiments, a station, be it winning or non-winning, calculates its index value A(p+1) for the following tournament on the basis of the index value A(p) used for the current tournament on the basis of this value $A_{n,def}^i$:

$$A(p+1)=A(p)+1-A_{n,def}^{i} \text{ if } A(p)<A_{n,def}^{i}$$

$$A(p+1)=A(p)-A_{n,def}^{i} \text{ if } A(p) \geq A_{n,def}^{i}$$

The method of regulating sending which has been described is applicable to WLAN networks and more generally to networks of CSMA/CA (Carrier Sense Multiple Access with Collision Avoidance) type in which access to the transmission medium must be controlled so as to prevent two sender stations from sending simultaneously, that is to say to avoid collisions. The method is particularly beneficial for use in contexts where numerous stations share access to the transmission medium.

The method of regulating sending is thus applicable to wired telecommunication networks, for example to a network using an electrical cable as transmission medium and implementing the technique of carrier currents (PLC, Power Line Communication).

In the case of sending by power line communication, access to the transmission medium is indeed controllable in the same way, the various signals of the tournament being sent via the electrical cable in the dedicated frequency range.

Although the present disclosure has been described with reference to one or more examples, workers skilled in the art will recognize that changes may be made in form and detail without departing from the scope of the disclosure and/or the appended claims.

The invention claimed is:

1. A method of regulating sending implemented by a station, having at least one packet to be sent via a communication network, participating in at least one tournament composed of a succession of selection rounds, the method comprising,
    obtaining by said station, for each selection round of a first tournament, a first binary value assigned to said station, representative either of an authorization to send, or of a prohibition to send,
    sending, on completion of the first tournament, said at least one packet by said station when said station determines, as a function of at least one of the first binary values assigned to said station for said selection rounds of the first tournament, that said station is authorized to send, said at least one packet sent by said station comprising data representative of a succession of the first binary values, assigned to said station for said selection rounds.

2. The method as claimed in claim 1, in which said data comprise said succession of the first binary values assigned to said station for said selection rounds.

3. The method as claimed in claim 1, in which said data comprise an index value on the basis of which said succession of first binary values has been determined.

4. The method as claimed in claim 1, in which said data comprise a value representing the length of a circular permutation intended to be applied to an index value assigned to a station participating in said first tournament so as to determine, for each selection round of a second tournament subsequent to the first tournament, of a second binary value assigned to said station, representative either of an authorization to send, or of a prohibition to send.

5. A method of regulating sending implemented by a station, having at least one packet to be sent via a wireless communication network, participating in at least one tournament composed of a succession of selection rounds, the method comprising,
    obtaining by said station, for each selection round of a first tournament, a first binary value assigned to said station, representative either of an authorization to send, or of a prohibition to send,
    listening for a sending of at least one packet sent by another station which is authorized to send on completion of the first tournament,
    said at least one packet sent by said other station comprising data representative of a succession of the first binary values, assigned to said other station for said selection rounds of the first tournament.

6. The method as claimed in claim 5, comprising implementation by said station of a second tournament subsequent to the first tournament, comprising determining, for each selection round of said second tournament, a second binary value assigned to said station, representative either of an authorization to send, or of a prohibition to send, on the basis of said data representative of the succession of the first binary values assigned to said other station.

7. The method as claimed in claim 6,
    in which a said first binary value assigned to said station for a selection round of the first tournament is obtained on the basis of an index value A(p) representative of the behavior of said station during the first tournament,
    in which said second binary value assigned to said station for a selection round of the second tournament is obtained on the basis of an index value A(p+1) representative of the behavior of said station during the second tournament,
    the method comprising determining of the index value A(p+1) on the basis of the index value A(p) and of data representative of the succession of the first binary values assigned to said other station.

8. The method as claimed in claim 7, in which said index value A(p+1) is obtained as follows:

$A(p+1)=A(p)+1-A_n^i$ if $A(p)<A_n^i$ $A(p+1)=A(p)-A_n^i$ if $A(p) \geq A_n^i$ where $A_n^i$ is a value obtained on the basis of said data representative of the succession of the first binary values assigned to said other station.

9. The method as claimed in claim 5, comprising implementation by said station of a second tournament subsequent to the first tournament, comprising determining, for each selection round of said second tournament, a second binary value assigned to said station, representative either of an authorization to send, or of a prohibition to send, on the basis of data representative of a predetermined succession of binary values representative of an authorization or prohibition to send.

10. The method as claimed in claim 9,
    in which a said first binary value assigned to said station for a selection round of the first tournament is obtained on the basis of an index value A(p) representative of the behavior of said station during the first tournament,
    in which said second value assigned to said station for a selection round of the second tournament is obtained on the basis of an index value A(p+1) representative of the behavior of said station during the second tournament,
    the method comprising determining of the index value A(p+1) on the basis of the index value A(p) and of data representative of a predetermined succession of binary values representative of an authorization or prohibition to send.

11. A device for regulating sending of a station, having at least one data packet to be sent via a communication network, participating in at least one tournament composed of a succession of selection rounds, the device comprising
    means for obtaining by said station, for each selection round of a first tournament, a first binary value assigned to said station, representative either of an authorization to send, or of a prohibition to send,
    means for sending, on completion of the first tournament, said at least one packet by said station when said station determines, as a function of at least one of the first binary values assigned to said station for said selection rounds of the first tournament, that said station is authorized to send,
    said at least one packet sent by said station comprising data representative of a succession of the first binary values, assigned to said station for said selection rounds.

12. A non-transitory information medium storing a computing program comprising software instructions for implementation of a method of regulating sending implemented by a station, when said program is executed by a data processor, said station having at least one packet to be sent via a communication network and participating in at least one tournament composed of a succession of selection rounds, the method comprising,
    obtaining by said station, for each selection round of a first tournament, a first binary value assigned to said station, representative either of an authorization to send, or of a prohibition to send,
    sending, on completion of the first tournament, said at least one packet by said station when said station determines, as a function of at least one of the first binary values assigned to said station for said selection rounds of the first tournament, that said station is authorized to send,
    said at least one packet sent by said station comprising data representative of a succession of the first binary values, assigned to said station for said selection rounds.

* * * * *